Feb. 17, 1959    R. B. BRIDGE ET AL    2,873,482
METHOD OF MAKING A PLASTIC ENCASED ARTICLE
Original Filed July 28, 1953                 2 Sheets-Sheet 1
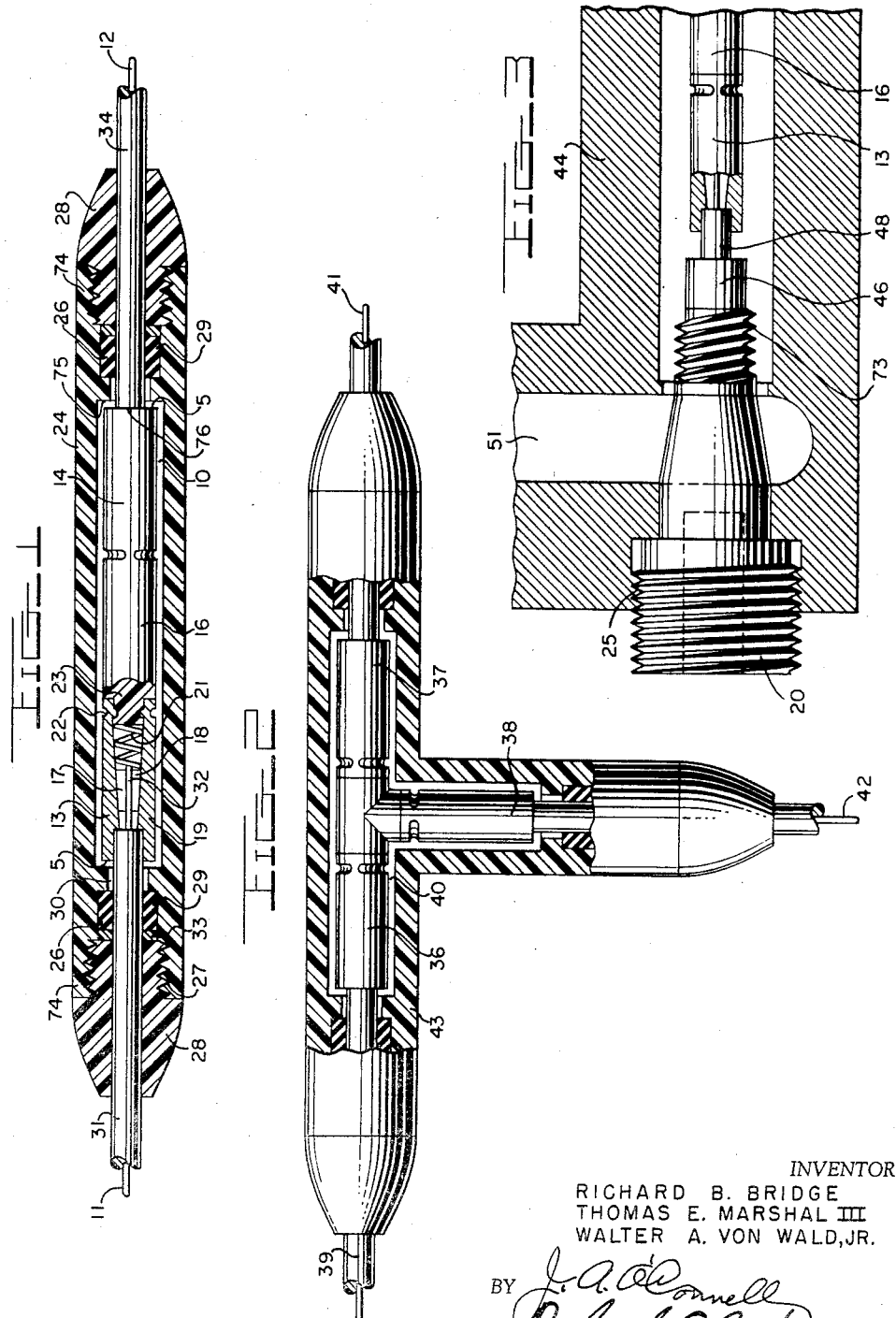
INVENTORS
RICHARD B. BRIDGE
THOMAS E. MARSHAL III
WALTER A. VON WALD, JR.
BY
ATTORNEYS Feb. 17, 1959  R. B. BRIDGE ET AL  2,873,482
METHOD OF MAKING A PLASTIC ENCASED ARTICLE
Original Filed July 28, 1953  2 Sheets-Sheet 2
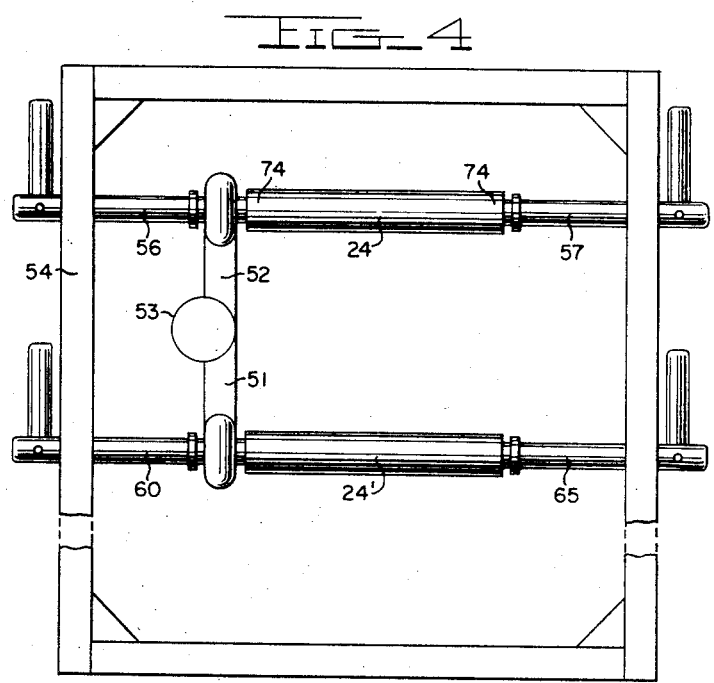
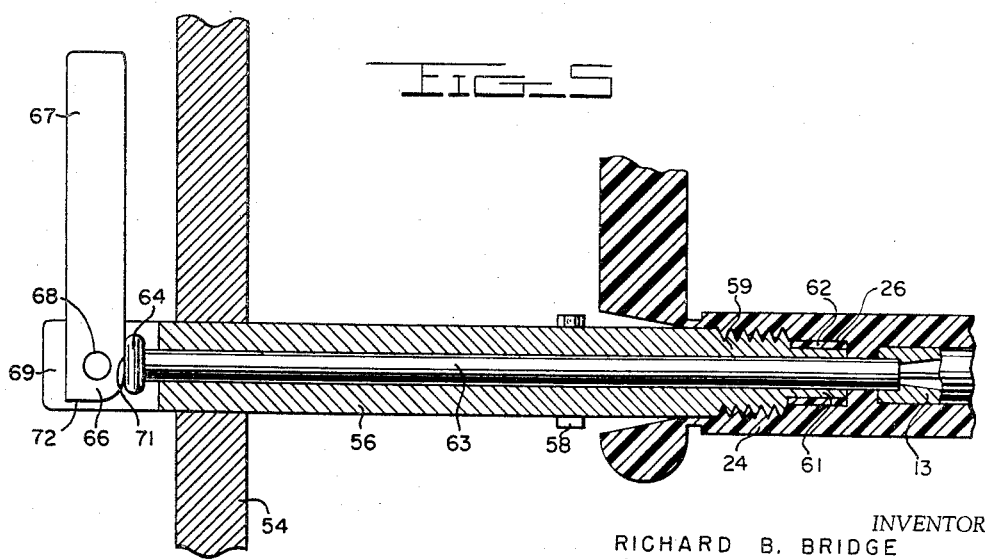
INVENTORS
RICHARD B. BRIDGE
THOMAS E. MARSHALL III
WALTER A. VON WALD, JR.
BY
ATTORNEYS

United States Patent Office 2,873,482
Patented Feb. 17, 1959

2,873,482
METHOD OF MAKING A PLASTIC ENCASED ARTICLE

Richard B. Bridge, Greenbelt, Md., Thomas E. Marshall III, Sterling, Va., and Walter A. Von Wald, Jr., Hillcrest Heights, Md., assignors to the United States of America as represented by the Secretary of the Navy Original application July 28, 1953, Serial No. 370,904. Divided and this application April 2, 1958, Serial No. 726,018

6 Claims. (Cl. 18—59)

(Granted under Title 35, U. S. Code (1952), sec. 266)

The invention described herein may be manufactured and used by or for the Government of the United States of America for governmental purposes without the payment of any royalties thereon or therefor.

The present invention relates in general to an article of manufacture comprised of a casing of plastic material molded about an enclosed element of relatively lower thermal coefficient of expansion, and method of making the same. This application is a division of application Ser. No. 370,904, filed July 28, 1953, and relates more in particular to the method of manufacture of antenna hardware such as strain insulators and antenna connectors having metal parts encased in a covering or casing of plastic material for purposes of weatherproofing and electrical insulation.

An object of the invention is the provision of an encasement of plastic material such as polymethyl methacrylate molded about a wire holding element of metal, in which is provided a clearance sufficient to compensate for the difference in thermal coefficient of expansion between the plastic material and the metal at variations in temperature in a range of from −85° F. to 130° F., such as may be encountered in aviation.

Another object is the provision of a special method of establishing a loose fit between a metallic article and a casing of plastic material such as polymethyl methacrylate molded thereabout.

Various other objects and advantages of the invention will become apparent from a perusal of the following specification and the drawings accompanying the same, wherein:

Fig. 1 is a section along the axis of the complete article.

Fig. 2 is a similar view of a modification applying the invention to a three-way or T-shaped clamping device.

Fig. 3 is a longitudinal or axial section of a portion of a mold used in forming the article.

Fig. 4 is a top plan view of a stretching jig used in the processing of the article.

Fig. 5 is an enlarged fragmentary view showing in section the stretching plug and its relation to the work piece.

Referring to the drawings in detail and first to Figure 1, here is shown an embodiment made according to the method of the invention in the form of a plastic-encased strain insulator in use for holding the ends of two insulated wires 11 and 12 together and insulated from each other. The strain insulator unit per se is comprised of a pair of wire holding chucks 13 and 14 secured together back to back through a joining element 16 of insulating material, in the present instance a plastic impregnated glass fabric. The chucks 13 and 14 are of the drill chuck type having a pair of toothed jaws 17 and 18 forming portions of a split cone wedged in the conical bore of the chuck housing 19 by action of a compression spring 21. A deep crimping 22 of the rear end of the chuck housing 19 onto a reduced end portion 23 of the joining element 16, establishes a strong strain resisting joint between the chuck and joining element. Thus with the chuck 14 similarly secured to the common joining element 16, the two chucks are electrically insulated but securely held together to resist substantial parting stresses. In the present instance in which the reduced end portion 23 of the joining element has a diameter of approximately three sixteenths of an inch, the joint has been found to resist a parting stress up to substantially three hundred and fifty pounds.

To avoid cracking or fracture of the casing due to the large difference in the temperature coefficient of expansion as between the material of the casing 24 and the metallic chuck elements, under wide temperature changes which may cover a range of from subzero to 130° F., a loose fit is provided between the casing 24 and the encased strain insulator element comprised of the parts 13, 14 and 16, as indicated at 5 at the ends and at 10 around the sides of the strain insulator element. In one practical form of the device the end clearances 5 are about one sixty-fourth of an inch and the side clearance 10 at least sufficient to be indicated by the presence of a reflecting layer of air between the casing and the enclosed chuck element and to prevent cracking of the casing at temperatures below −85° F.

At each end of the casing is provided a cylindrical sealing chamber 26 similar to a stuffing box, internally threaded at 27 near its outer end to receive an externally threaded plug cap 28 for compressing a seal ring 29 fitted into the inner end of the sealing chamber. A cylindrical passageway 30 extending from the inner end of the sealing chamber to the front end of the chuck 13, and a bore extending axially through the plug cap 28, both of substantially less diameter than the sealing chamber 26, provide entrance for a suitable insulated cable or wire 31 to permit the bared end 32 of such a cable to be engaged by the clamping chuck jaws 17—18.

The seal ring 29 may be of any suitable deformable material of high dielectric strength, in the present instance soft silicone rubber. A buffer washer 33 of less deformable material is positioned between the end of the plug cap and the seal ring. Compression of the seal ring by the plug through the washer spreads the seal ring outwardly against the casing and inwardly against the insulated cable 31. Similarly the other cable 34 is clamped and sealed at the other end.

Referring to Figure 2, here is shown the invention embodied in a three wire clamping device comprising three metallic, cylindrical chuck elements 36, 37 and 38 secured together in electrical conductive relation and facing in divergent directions to receive and clamp together in electrical connection, three convergent wires or cables 39, 41 and 42 respectively, the clamping and sealing being the same as that described in connection with Figure 1. Also in the embodiment shown in Figure 2, a clearance 40 is provided in all directions between the casing 43 and the chuck elements 36, 37 and 38. The device shown in Figure 2 is useful in establishing and maintaining a weatherproof T-connection with an aerial.

To obtain the structure above described the following method is pursued, reference being had to Figure 3. The view here shown is of a portion of a metallic mold 44 near the runner end of the mold, it being understood that the other end is similar in all respects except for the absence of a runner. Thus each end is provided with an externally threaded core element 46 for forming an internally threaded seating chamber such as 26 of Figure 1, the centering extension 48 of the core elements serving to center the prefabricated strain insulator unit comprised of the elements 13, 16 and 14. Any known or other suitable arrangement for facilitating placement and removal of the core plugs may be utilized, for example as indicated in Figure 3, these plugs may be threaded into place by means of engagement of an externally threaded portion 20 near the head of the plug with a complementary internally threaded bore 25 in the wall of the mold, the threads being of the same pitch as the threads 73 on the plug 46, so that after molding, the plugs may be readily withdrawn from the molded casing simply by turning. It will be understood that the mold 44 may have two or more molding chambers ganged together to receive molding material from a common supply manifold or sprue. In accordance with known practice the molding material in a plastic state, under suitable molding pressure and temperature, is extruded from a suitable heated source of supply into the runner 51 of the mold through a suitable sprue not shown, which sprue may be common to two or more mold cavities in accordance with usual practice in molding. In the present instance where the molding material is polymethyl methacrylate or similar acrylic resin there is used a pressure in the neighborhood of 20,000 pounds per square inch and a temperature of about 450° F. or within the limits of 200° F. to 600° F. To avoid a too rapid loss of heat from the molding material, the mold is kept preferably at a substantially constant temperature of about 200° F. It will be understood that the mold may be made separable in any known or other suitable manner for releasing the molded casing from the mold.

The portion of the method above described is conventional practice. Its purpose is to produce the casing 24 of Figures 1, 4 and 5 molded on to the strain insulator per se.

It is from this point on that novel steps are taken to produce in the finished article the loose fit between the casing and the encased object. These steps are as follows:

After the mold has been filled, which in the present instance requires about four seconds, the molded casing is allowed to remain in the mold to give off some of its heat to bring its temperature down to about 225° F. or within a margin of from 230° F. to 200° F. In the present instance this requires about one and one half minutes. The molded casing is then removed having cooled sufficiently to permit it to be handled without undue distortion but sufficiently plastic to permit controlled reshaping under application of controlled stresses.

The molded article in this thermal condition is immediately set up in a stretching jig as indicated in Figure 4 where the two ends 74 of the casing are stretched apart sufficiently to pull each inner end 75 (Fig. 1) of the casing away from the adjacent end 76 of the encased object to leave a clearance 5 (Figure 1) of about one sixty-fourth of an inch at each end.

It has been found that upon so stretching the casing a reflecting layer 10 of air or gas is seen to form between the sides of the encased object and the casing.

While one might expect the stretching step to result in a tightening of the casing about the core element, the fact is that a loosening takes place as evidenced by the formation of the reflecting layer. It is to be noted that during processing the outside of the casing is always cooler than the inside which may account in some way for the apparently paradoxial behavior.

Without commitment to any particular theory, the thought may be expressed that the formation of the layer of air or gas may be enhanced by a tendency of the inner layer upon cooling to shrink away from the core element due to previous setting or hardening of the cooler outer layer holding it substantially fixed as to outer diameter with the inner portion prevented from shrinking away from the core element by adherence to the latter until such adhesion is broken in the stretching step.

It is desirable to cast the casings in pairs and to place such a pair, unseparated from the common sprue, in the stretching jig as shown in Figure 4. Here is shown such a pair unseparated from the runners 51, 52 and common sprue 53. The pair of molded casings 24—24' are set up in the stretching frame or jig 54, each by means of a pair of stretching plugs such as 56—57 for stretching the ends of the casing outwardly away from the ends of the encased strain insulator. Referring to Figure 5 the stretching plug 56 is comprised of a cylindrical plug body mounted for rotational and sliding movement in the frame or jig 54, the sliding movement being limited in suitable manner as by a suitable stop ring 58. The inner end of the plug is externally threaded at 59 to engage in the internally threaded end of the casing 24 and is provided with an extension 61 of reduced diameter which, with a bushing 62 of rubber, "Teflon" or similar material, snugly engages the walls of the sealing chamber 26 to prevent marring the latter. A ram 63 of rod-form slidably mounted in the stretching plug 56 extends into the end of the chuck element 13 to abut thereagainst. The outer end of the ram 63 is provided with a cam follower head 64 against which bears a cam member 66 formed near the pivoted end of an operating lever 67 pivoted at 68 in the bifurcated end of the plug 56, one of the branches of the bifurcation being shown at 69. It will be understood that the other stretching plug 57 (Figure 4) is similar in all respects to the plug 56.

In the use of the stretching jig to carry out the stretching step, the pair of newly cast casings with their common sprue 53 still heated to about 225° F., are placed in the jig as indicated in Figure 4, all four of the stretching plugs 56, 57, 60 and 65 (Figure 4) being threaded into the ends of the casings to bring the rams such as 63 into abutment with the ends of the metallic chucks such as 13. For threading the plugs into the casings the levers such as lever 67 set normal to the axis of the plug as shown in Figure 5, serves as a crank to rotate the plug about its axis. The ram 63 is of such length that with the lever 67 in the position shown and the plug fully inserted as shown, the free end of the ram will abut the end of the metallic chuck 13 with the cam follower bearing against the small-radius surface 71 of the cam 66. The long-radius surface 72 of the cam differs in length of radius an amount equal to the desired amount of stretch of the end of the casing away from the end of the chuck, in the present instance about one sixty-fourth of an inch. Thus when the lever 67 is swung outwardly 90° about its pivot 68 the long-radius cam surface 72 is gradually brought against the cam follower 64 so that with the ram abutting the chuck, the stretching plug 56 and with it the adjoining end of the casing 24 is moved away from the chuck about one sixty-fourth of an inch leaving the desired clearance between the inner end surface of the casing and chuck. This stretching is done at both ends of the casing at about the same time or simultaneously. It has been found that when the casing is thus stretched to produce the desired clearance at both ends there also occurs a loosening of the inside side walls of the casing from the encased strain insulator as evidenced by the formation of a reflecting layer 10 of air or gas, which loose fit has been found in practice to be sufficient to prevent cracking or other injury to the casing at temperatures as low as −85° F.

After the above stretching step, the casings are maintained in the stretched condition while cooling to a temperature below 180° F. The casings then slightly above room temperature are removed from the stretching jig, and the sprue and runners removed. The resulting completely formed casings each enclosing its strain insulator, are then placed in an annealing oven at about 180° F., and allowed to remain there at the temperature for a period of from one to two hours, after which they are removed and are then ready for use.

It will be understood how the modification shown in Figure 2 may be formed in a manner similar in all respects to that described above except that three stretching plugs are used. It will also be understood that because in the stretching operation, tension is applied to the vertical element of the T-form by a pull applied to the end of the casing element through a stretching plug such as 56 (Fig. 5) abutting or pressing against the core element 38 through a ram such as 63 (Fig. 5), there is no appreciable bending of the top or horizontal element of the T-form.

While certain specific embodiments of the invention both as to structure and method, have been herein described in detail for the sake of disclosure, it is to be understood that the invention is not limited to such specific embodiments but contemplates all such modifications and variants thereof as fall fairly within the scope of the appended claims.

What is claimed is:

1. The method of forming a cylindrical casing of thermoplastic material having a relatively high temperature coefficient of expansion about a cylindrical object having a relatively low thermal coefficient of expansion, which comprises molding the cylindrical casing about the object in a suitable mold and under suitable known temperature and pressure, removing the molded encasement and enclosed object from the mold while at a temperature sufficiently below molding temperature to permit handling without undue distortion of the casing, and longitudinally stretching the casing to move the interior ends away from the object to produce a clearance between the ends of the object and the casing and loosen the casing away from the object, and maintaining the casing in the stretched condition while cooling to a temperature below 180° F.

2. The method of making an article having an object encased in a casing of thermoplastic material with the object held against movement out of the casing in any direction but with a clearance between the object and the casing in all directions, which consists in molding the casing about the object in a mold maintained at a temperature sufficient to maintain the thermoplastic material plastic, permitting the mold to cool to a temperature sufficiently low to allow the casing to be removed without distortion, removing the casing from the mold while still hot enough to permit limited distortion without fracture, placing the casing under tension to stretch the same and pull opposite ends of the interior of the casing away from adjacent ends of the said object and loosen the casing away from the object, and maintaining the article so tensioned while cooling to a temperature at which the shape of the casing becomes set, resulting in a loosening of the casing in all directions around the object.

3. The method of forming a casing of thermoplastic material about an object to be held within the casing against movement out of the casing in any direction but with a clearance in all directions between the object and the interior of the casing, which method comprises the following steps; molding the casing about the object at the molding temperature of said material, allowing the temperature of the molded casing to drop to a value where the molded casing will retain its shape outside the mold under moderate stresses, removing the molded casing and the contained object from the mold while at the said reduced temperature but still sufficiently hot to change shape under relatively high stress, stretching the casing in diametrically opposite directions to pull the interior of the casing away from opposite ends of the object in the direction of pull to produce a clearance between opposite ends of the object and the interior of the casing in the direction of pull and loosen the casing from the sides of the object, cooling the casing and contained object to a lower temperature while restraining the casing against shrinkage in the said direction of pull, relieving the pulling stress and annealing the casing at a suitable annealing temperature for a period of from one-half to two hours, whereby is produced a loose fit between the object and the interior of the casing in all directions.

4. The method of forming a casing of thermoplastic material about an object to be held within the casing against movement out of the casing in any direction but with a clearance in all directions between the object and the interior of the casing, which method comprises the following steps; molding the casing about the object in a heated mold at the molding temperature of the said material, reducing the temperature of the mold to a value where the molded casing will retain its shape outside the mold under moderate stresses, removing the molded casing and the contained object from the mold while at the reduced temperature but still sufficiently hot to change shape under relatively high stress, pulling the ends of the casing in different directions away from the object to produce a loose fit between the object and the interior of the casing in the said different directions of pull, cooling the casing to a lower temperature while restraining the casing against shrinkage in said directions of pull, removing the pulling stresses and annealing the casing at a suitable annealing temperature for a period of from one-half to two hours, whereby is produced also a clearance between the object and the interior of the casing in substantially all the remaining directions in addition to the said directions of pull, resulting in a clearance between the object and the interior of the casing in all directions.

5. The method of forming a casing of thermoplastic material about a metallic wire holder to be held within the casing against movement out of the casing in any direction and having a plurality of wire clamping chucks arranged with their wire receiving ends facing in different directions which method comprises the following steps; molding the casing about the wire holder with suitable cores to provide entrance channels to the chucks, said molding being effected in a mold heated to the molding temperature of the said material, allowing the temperature of the molded casing to drop to a temperature at which the molded casing may be removed from the mold and handled without undue distortion but sufficient to permit substantial change in shape without fracture, removing the molded casing and the contained wire holder from the mold at the reduced temperature, pulling the ends of the casing away from the wire receiving ends of the chucks to provide a substantial clearance between such ends and the casing in the directions of pull and loosen the casing from the sides of the object, cooling the casing to a lower temperature while retaining the casing against shrinkage in the directions of pull, relieving the pulling stress and annealing the casing at said last reduced temperature for a period of from one-half to two hours.

6. The method of forming a casing of thermoplastic material about a metallic wire holder to be held within the casing against movement out of the casing in any direction and having a plurality of wire clamping chucks arranged with their wire receiving ends facing in different directions which method comprises the following steps; molding the casing about the wire holder with suitable cores to provide entrance channels to the chucks, said molding being effected at a temperature of about 450° F. with polymethyl methacrylate in a mold at a temperature in the neighborhood of 200° F., permitting the temperature of the molded casing to drop to about 225° F., removing the molded casing and the contained wire holder from the mold at the reduced temperature, pulling the ends of the casing away from the wire receiving ends of the clutches to provide a clearance between such ends and the casing in the direction of pull and loosen the casing from the sides of the object, cooling the casing to a temperature of about 180° F. while retaining the casing against shrinkage in the directions of pull, relieving the pulling stress and maintaining the casing at an annealing temperature of about 180° F. for a period of from one-half to two hours.

References Cited in the file of this patent

UNITED STATES PATENTS

| | | |
|---|---|---|
| 2,444,904 | Worley | July 6, 1948 |
| 2,563,829 | Fitzgerald et al. | Aug. 14, 1951 |
| 2,716,623 | Tator | Aug. 30, 1955 |